US006926140B2

(12) United States Patent
Bergh et al.

(10) Patent No.: US 6,926,140 B2
(45) Date of Patent: *Aug. 9, 2005

(54) DOUBLE SIDED SLEEVE WITH A SINGLE SHEET NON-WOVEN MATERIAL FOR HOLDING COMPACT DISCS

(75) Inventors: James Allen Bergh, Boulder, CO (US); Mark E. Phillips, Westminster, CO (US); Terrence Martin Drew, Superior, CO (US)

(73) Assignee: Case Logic, Inc., Longmont, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 10/387,658

(22) Filed: Mar. 12, 2003

(65) Prior Publication Data

US 2003/0173770 A1 Sep. 18, 2003

Related U.S. Application Data

(63) Continuation of application No. 10/011,575, filed on Dec. 3, 2001, now Pat. No. 6,698,587, which is a continuation-in-part of application No. 09/750,008, filed on Dec. 27, 2000, now Pat. No. 6,325,207.

(60) Provisional application No. 60/094,768, filed on Jul. 31, 1998.

(51) Int. Cl.[7] ............................................. B65D 85/30
(52) U.S. Cl. .................................. 206/308.1; 206/312
(58) Field of Search ............................... 206/232, 312, 206/308.1, 309, 310, 311, 493

(56) References Cited

U.S. PATENT DOCUMENTS

| 1,098,154 | A | 5/1914 | Housh |
| 4,263,357 | A | 4/1981 | Holson |
| D261,155 | S | 10/1981 | Nast ............................ D19/33 |
| 4,620,630 | A | 11/1986 | Moss |
| 4,850,731 | A | 7/1989 | Youngs |
| 5,301,445 | A | 4/1994 | Hoffmeister |
| D353,837 | S | 12/1994 | Miller ......................... D19/33 |
| 5,396,987 | A | 3/1995 | Temple et al. |
| 5,462,160 | A | 10/1995 | Youngs |
| 5,501,326 | A | 3/1996 | Shuhsiang |

(Continued)

FOREIGN PATENT DOCUMENTS

| JP | 1996026367 A | 1/1996 |
| JP | 1997077170 A | 3/1997 |

OTHER PUBLICATIONS

U.S. Appl. No. 29/153,983, filed Jan. 2002, Fu.
U.S. Appl. No. 29/167,663, filed Sep. 2002, Fu et al.
U.S. Appl. No. 10/267,155, filed Oct. 2002, Fu et al.
U.S. Appl. No. 10/011,575, filed Dec. 3, 2001, Bergh et al.
Case Logic 1999 Catalog, p. 23.
Case Logic Spring 1999 Catalog, pp. 3, 29.
Case Logic 2000 Catalog, p. 31.
Case Logic 2001 Catalog, p. 31.
Case Logic 2002 Catalog, pp. 24, 25.
U.S. Appl. No. 10/238,454, filed Sep. 9, 2002, Bergh et al.
U.S. Appl. No. 10/387,656, filed Mar. 12, 2003, Bergh et al.
Digital photos and sample of a Case It Disc Sleeve.

*Primary Examiner*—Shian T. Luong
(74) *Attorney, Agent, or Firm*—Sheridan Ross P.C.

(57) ABSTRACT

A single sheet of non-woven material is provided with sufficient strength and durability to store two compact discs without the necessity of laminating or otherwise interconnecting the non-woven sheet to a backing sheet or other materials for strength. The single sheet of non-woven material is positioned between the playing surfaces of the two compact discs to provide a non-scratching, protective surface and to reduce the costs associated with manufacturing the sleeves used to store the CDS.

14 Claims, 5 Drawing Sheets

U.S. PATENT DOCUMENTS

| | | |
|---|---|---|
| 5,501,540 A | 3/1996 | Ho |
| 5,531,320 A | 7/1996 | Uchida ................... 206/308.1 |
| 5,555,977 A | 9/1996 | Oshry et al. ............. 206/308.1 |
| 5,556,683 A | 9/1996 | Ranalli |
| 5,588,527 A | 12/1996 | Youngs |
| 5,588,528 A | 12/1996 | Ozeki |
| 5,595,797 A | 1/1997 | Miller |
| 5,620,271 A | 4/1997 | Bergh et al. ................... 402/79 |
| 5,692,607 A | 12/1997 | Brosmith et al. |
| 5,715,937 A | 2/1998 | Oshry et al. |
| 5,720,384 A | 2/1998 | Wu-Chen |
| D391,989 S | 3/1998 | Plutsky |
| 5,806,677 A | 9/1998 | Storti |
| 5,816,305 A | 10/1998 | May |
| 5,882,748 A | 3/1999 | Tomoda |
| D411,402 S | 6/1999 | Udwin et al. ................ D6/626 |
| 5,975,291 A | 11/1999 | Attar et al. |
| D421,869 S | 3/2000 | Drew et al. |
| D428,297 S | 7/2000 | Drew et al. |
| D431,408 S | 10/2000 | Drew et al. |
| D432,343 S | 10/2000 | Drew et al. |
| 6,186,320 B1 | 2/2001 | Drew |
| 6,210,798 B1 | 4/2001 | Sandor et al. |
| D441,591 S | 5/2001 | Drew |
| 6,241,086 B1 | 6/2001 | Bergh et al. |
| 6,267,234 B1 | 7/2001 | Bergh et al. |
| 6,325,207 B2 | 12/2001 | Drew |
| D453,428 S | 2/2002 | Beer .......................... D6/407 |
| 6,446,800 B2 | 9/2002 | Bergh |
| 6,681,929 B2 | 1/2004 | Bergh et al. ............. 206/308.1 |
| 6,698,587 B2 | 3/2004 | Bergh et al. ............. 206/308.1 |

DOUBLE SIDED SLEEVE WITH A SINGLE SHEET NON-WOVEN MATERIAL FOR HOLDING COMPACT DISCS

CROSS REFERENCE TO RELATED APPLICATIONS

This application is a continuation application of pending U.S. patent application Ser. No. 10/011,575 having a filing date of Dec. 3, 2001, now U.S. Pat. No. 6,698,587, which is a continuation-in-part application of Ser. No. 09/750,008 now issued U.S. Pat. No. 6,325,207, having a filing date of Dec. 27, 2000, which claims priority of U.S. Pat. No. 6,186,320, having a filing date of Jun. 29, 1999, which claims priority of U.S. provisional patent Application Ser. No. 60/094,768 having a filing date of Jul. 31, 1998, each pending or issued patent being incorporated herein in its entirety by reference.

This application claims priority of U.S. provisional patent Application Ser. No. 60/094,768 having a filing date of Jul. 31, 1998 and being incorporated herein in its entirety by reference.

FIELD OF THE INVENTION

This invention relates to flexible storage sleeves used to hold compact discs, digital video discs and CD ROMs which store musical, video, graphical or other types of information.

BACKGROUND OF THE INVENTION

Compact discs, digital video discs and CD ROMs (hereinafter referred to as "CDS") are used extensively to store information which can be retrieved and played back by the user. The information stored can relate to music, video, instructional materials, games and numerous other variations of data. The information is than played back on CD players, video disc recorders and players, and personal computers.

CDS are typically sold at the retail level in rigid, hard plastic cases known in the music industry as "jewel boxes". Although protective of the sensitive playing surfaces found on the CDS, the jewel boxes are bulky, difficult to open, often crack because of the rigidity of the plastic, are expensive to manufacture and are environmentally insensitive. Thus, flexible "sleeves" have become increasingly used by consumers to replace jewel boxes, primarily in the aftermarket once consumers have purchased their CDS from the retail distributor. The flexible sleeves are commonly made from plastic type materials such as polypropylene or vinyl and are formed by placing one or more sheets of the flexible material in an overlying relationship to created one or more "pockets" to receive the CD. Additional pockets may be used to hold the graphics which accompany the CDS, or alternatively may hold another compact disc.

To protect the playing surface of the compact disc which retains the sensitive stored information, different types of materials are commonly used. These include woven fabrics such as velours and cottons, as well as non-woven fabrics such as Sontara®, Stearns®, or other materials. Unfortunately, these materials must be laminated or in some form bonded to either a backing material or in some instances another layer of non-woven material to provide sufficient structural integrity to prevent tearing after repeated use. Typically, a polypropylene or other similar type of backing material is used to provided structural support and to provide a low friction material to facilitate the insertion and removal of graphics. One such sleeve is identified in U.S. Pat. No. 4,850,731 to Youngs.

The manufacturing of storage sleeves which have dual pockets for storing two CDS or one CD and accompanying graphics has thus been limited to materials which preferably have a non-woven material with a backing sheet for support, or which is laminated to another non-woven material. In either example, a lamination process is required in the form of heat bonding, or "welding". This lamination process is time consuming, expensive and thus undesirable for the manufacturing of CD storage sleeves. Accordingly, significant demand exists for a durable, non-woven material which has a texture capable of protecting the playing surface of CDS yet is sufficiently durable for holding CDS and/or graphics without tearing or otherwise failing after repetitive use. The material must generally be manufactured using well known sleeve manufacturing techniques to retain the cost benefits associated with known sleeve production.

SUMMARY OF THE INVENTION

It is thus one object of the present invention to provide a carrying sleeve or pocket for holding compact discs which is made from a single-sheet material which is protective of the playing surface of the CD, yet durable enough not to tear or otherwise become altered or destroyed after considerable use. Preferably the material can be used as a middle sheet between a front sheet and a back sheet to create two pockets for independently holding two CDS.

It is yet another object of the present invention to provide a sleeve for holding CDS which can be manufactured from a non-woven material without the use of a backing sheet or which otherwise would require laminating, bonding or other form of interconnection means between two or more sheets of material. This may include the bonding of non-woven materials to other non-woven materials or alternatively the bonding of a non-woven material to a woven material or to sheet backing materials such as plastic, vinyl or other materials known in the art.

Thus, in one aspect of the present invention a non-woven material known by the trade name of "Veratec"® is used as the non-woven sleeve material. This single sheet material is capable of being used as an independent, stand alone sheet of non-woven material which does not require any lamination or bonding to other sheets of material for durability and support. Further, the material is pliable and flexible enough to permit conventional manufacturing techniques to be used to form various designs of CD sleeves. Thus, numerous designs may be used for a variety of different CD storage requirements. These include sleeves designed for holding single CDS, multiple CDS and album type pages with a multiplicity of CD sleeves positioned on a page and adapted for interconnection to a 3-ring notebook or other similar device. In a preferred embodiment of the aforementioned design a single sheet of non-woven material is "sandwiched" between two stored CDS, thus providing a protective non-woven material for contact with the sensitive playing surfaces of each of the two CDS.

It is another aspect of the present invention to provide a sleeve for holding CDs that includes a "write-on" title strip positioned along a perimeter edge of the storage sleeve. Preferably, the write-on title strip is comprised of a material that allows pen, ink, felt tip marker, pencil or other form of writing medium to be legibly displayed, yet may also be erased in another embodiment to change titles or other information in the future. Thus, in one embodiment of the present invention materials such as paper, polypropylene, polyethylene, nylon or other similar materials known in the art may be used for the write-on title strip. In another embodiment of the invention a pocket positioned proximate to the upper edge of the storage sleeve that is adapted for holding the title strip.

DETAILED DESCRIPTION OF THE PREFERRED EMBODIMENT

Figure 1A:
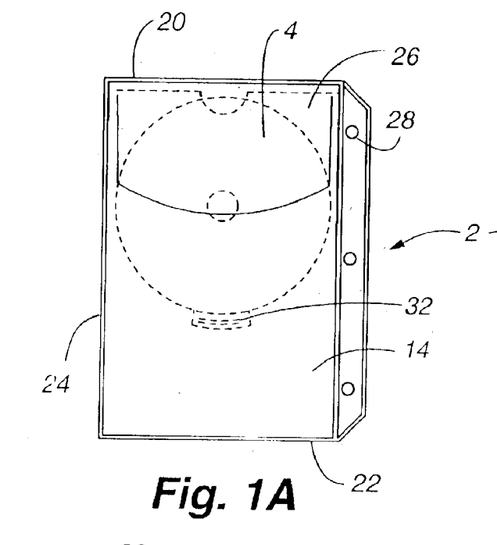
FIGS. 1A and 1B are front and back views respectfully of a sleeve for holding a CD (digital video disc) with a flap and single non-woven sheet positioned between the two pockets created for holding the CD.
Figure 1B:
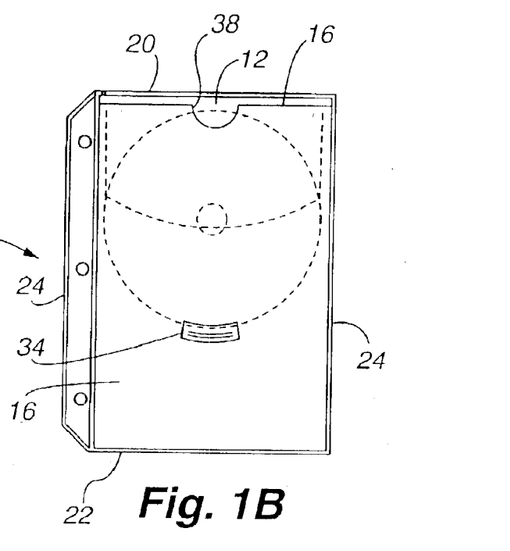
Figures 2A, 2B, 2C:
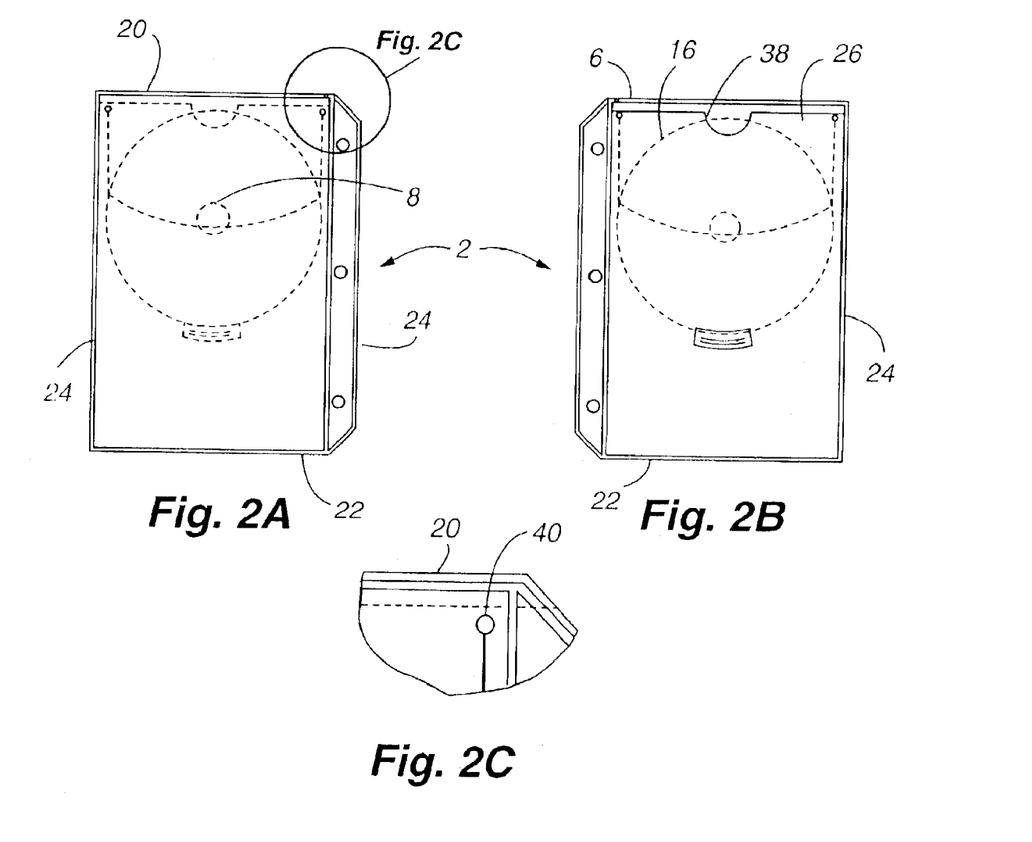
FIGS. 2A, 2B and 2C are depictions of the invention shown in FIG. 1, i.e. front view, back view and detailed view, respectfully, with relief holes provided at the top of the flap to resist tearing.
Figure 3A:
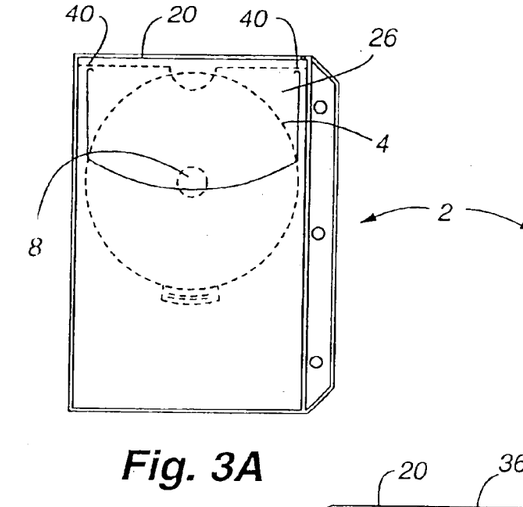
FIGS. 3A and 3B are depictions of the invention shown in FIG. 1 with arcuate cuts near the top of the flap to inhibit tearing.
Figure 3B:
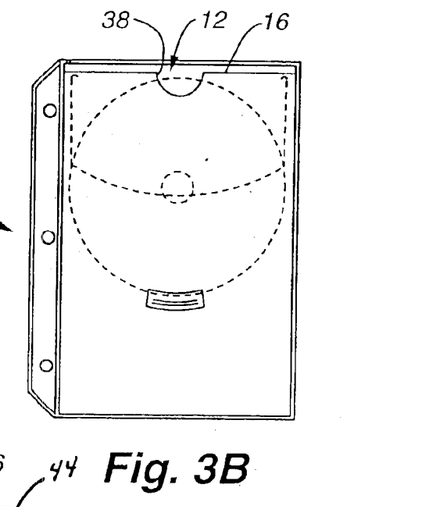
Figure 4:
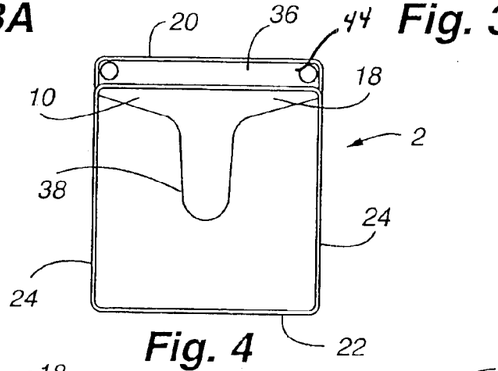
FIG. 4 identifies a double sided sleeve capable of holding two CDS with a non-woven single sheet positioned between the two CDS, and a title strip near the upper edge for holding graphics notes.
Figure 5:
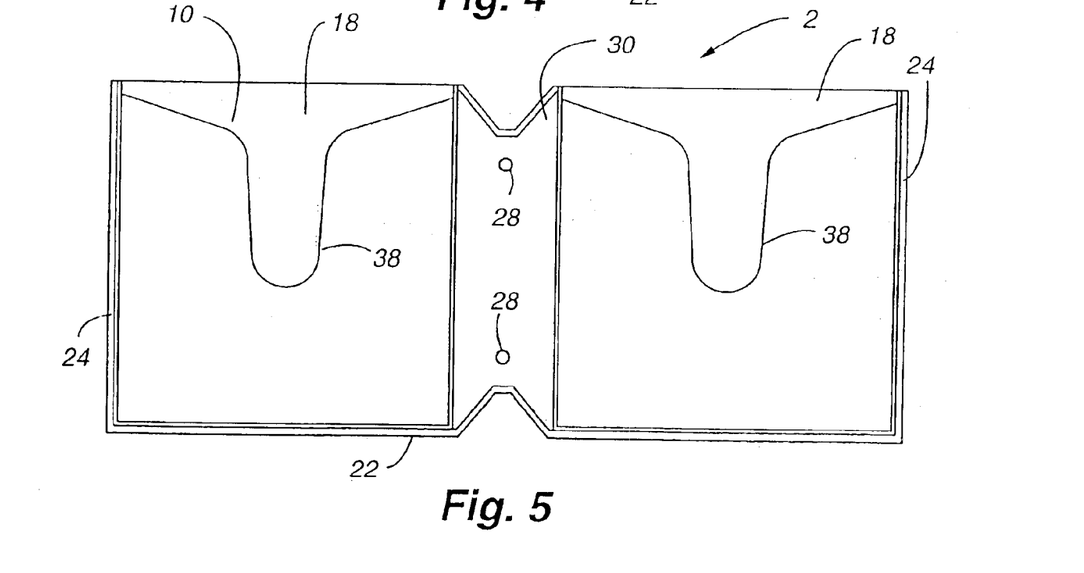
FIG. 5 is a sleeve design capable of holding two CDS on the front side and two CDS on the back side and adapted to fit into a binding device.
Figures 6, 7:
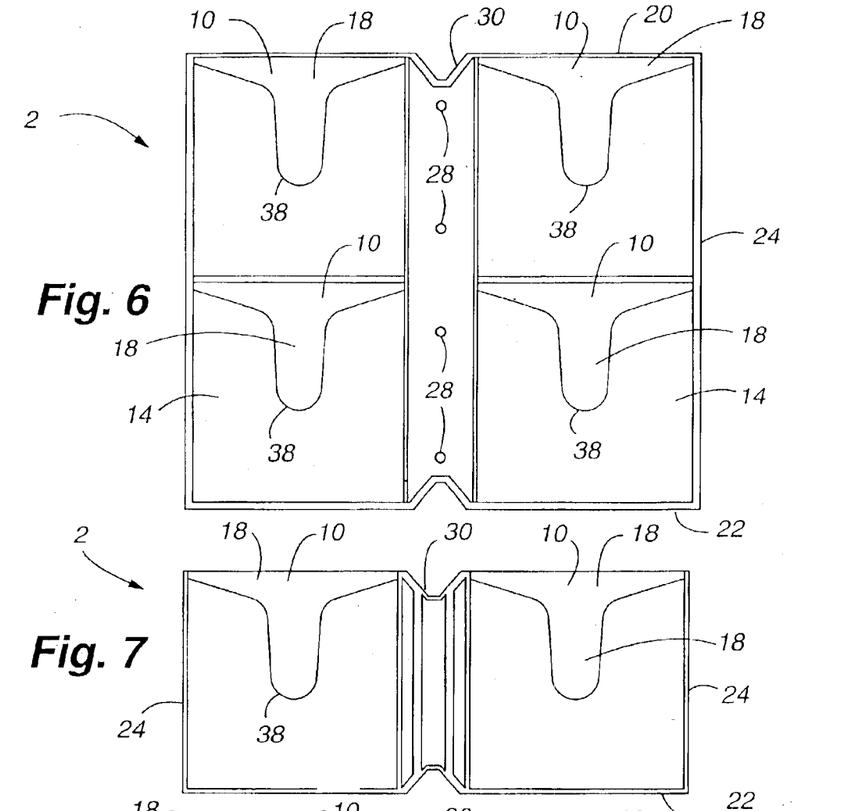
FIG. 6 is a sleeve design capable of holding 4 CDS on the front side and 4 CDS on the back surface and adapted to be bound in a notebook or other type of binding device.
FIG. 7 is an alternative design of a sleeve design capable of holding two CDS on both the front and back sides of the sleeve and using a non-woven single sheet of material between each pair of opposing CDS.
Figure 8:
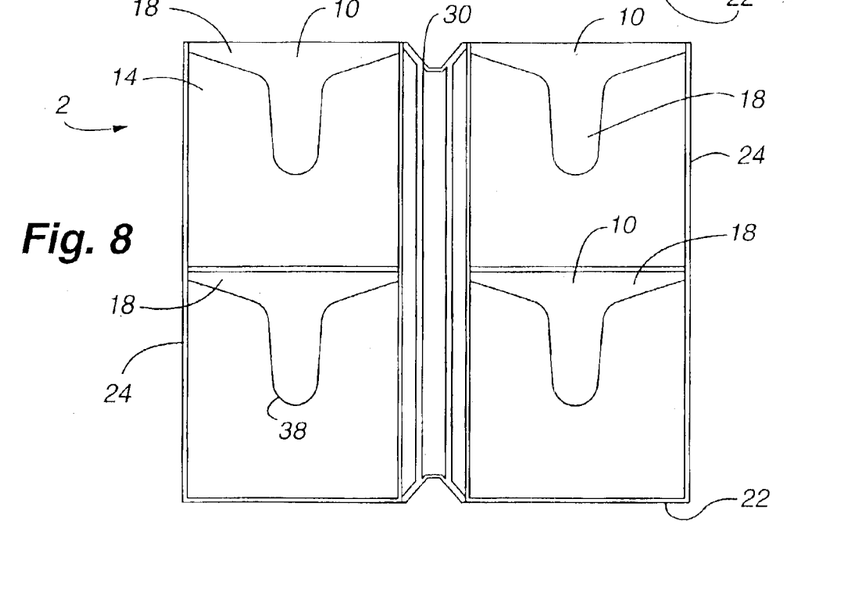
FIG. 8 is an alternative design of the invention shown in FIG. 6 (no holes for an album) and utilizing a non-woven material between each of the opposing compact disc playing surfaces.
Figures 9, 10:
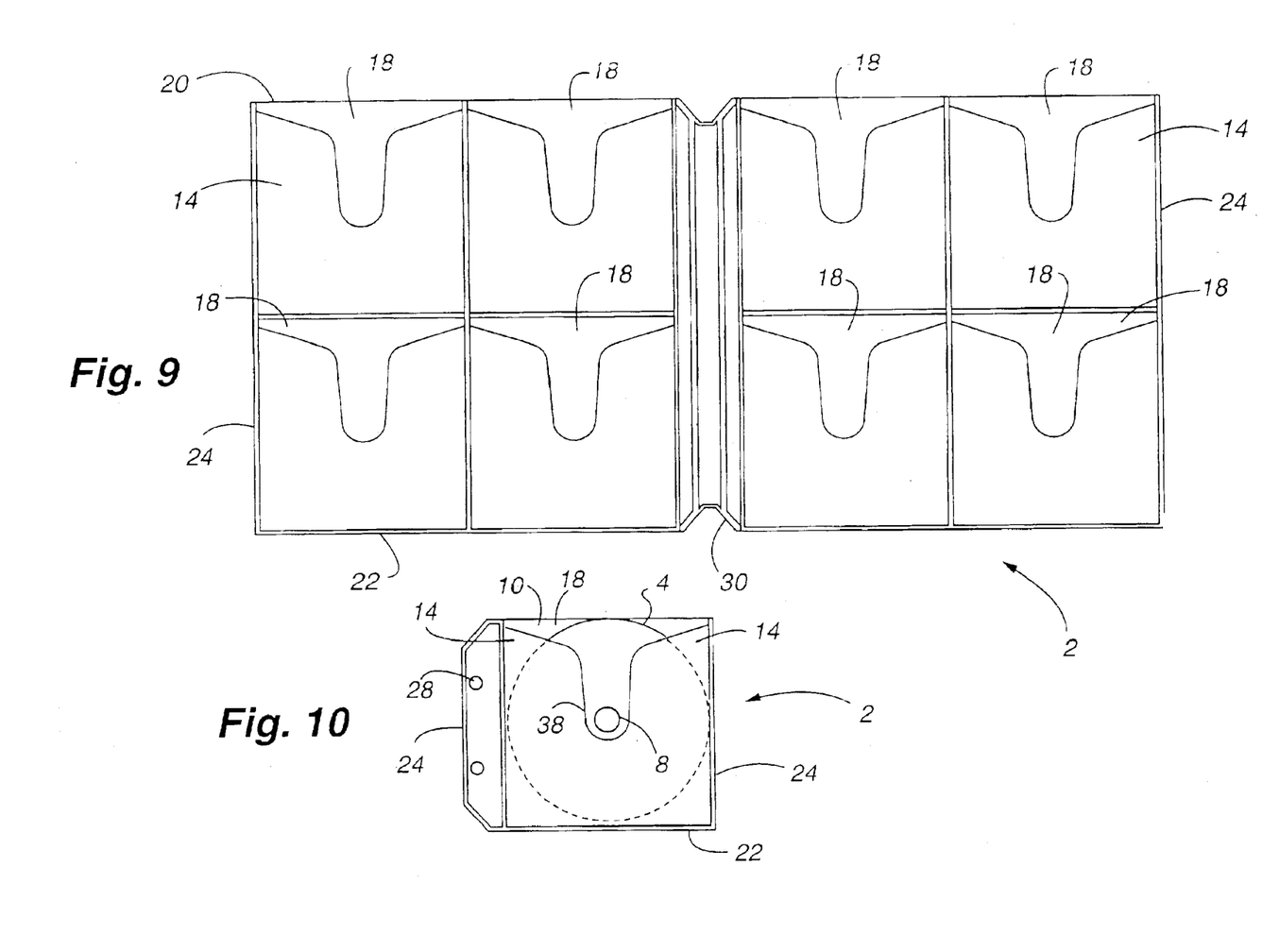
FIG. 9 is a depiction of an 8 pocket sheet capable of holding 8 CDS per side or a total of 16 CDS per sheet.
FIG. 10 is a of a sleeve capable of holding one CD on the front side and another CD on the back side and adapted for being interconnected to a wallet type binding device.
Figure 11:
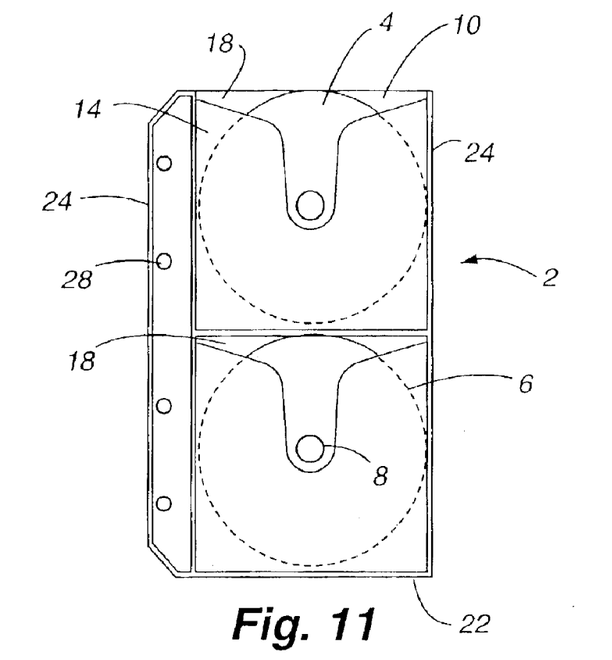
FIG. 11 is an alternative design of a sleeve capable of holding 2 CDS on the front side and 2 CDS on the back side and adapted for being interconnected to a wallet or other type of binding device.
Figure 12:
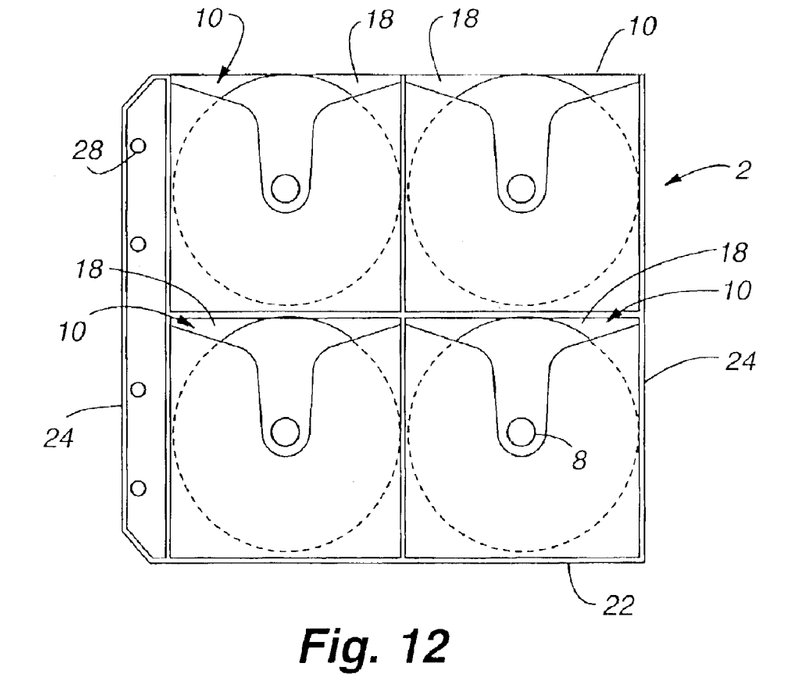
FIG. 12 is an alternative sleeve design capable of holding 4 CDS on the front side and 4 CDS on the back side and adapted for being interconnected to a wallet or other type of binding device.

Referring now to the drawings, FIGS. 1–12 represent numerous embodiments and designs of storage sleeves used to hold CDS. Each of the various designs, however, utilize the novel feature of a single, non-laminated sheet of non-woven material used in conjunction with a CD storage sleeve. In a preferred embodiment, the single sheet of non-woven material is positioned between a flexible front sheet and a flexible back sheet to create two opposing pockets, each pocket being capable of holding a CD. For reference purposes, a two-sided sleeve as referred herein means a sleeve having two pockets for holding two separate CDS, the two pockets having a common non-woven middle sheet which is in contact with the playing surface of the CD. Thus, in a typical sleeve design there is a first sheet, a second sheet and a third sheet which are laminated or bonded on at least three peripheral edges to create two pockets for receiving CDS.

FIGS. 1–12 generally depict numerous variations of storage sleeves 2 used to store one or more compact discs or digital video discs 4 with or without an associated graphics page, and including a single sheet non-woven material. The drawings identify the various components associated therein, including a first pocket 10, second pocket 12, front sheet 14, back sheet 16, non-woven middle sheet 18, top edge 20, bottom edge 22, side or lateral edge 24, flap 26, binding aperture 28, sleeve spine 30, stop weld 32, stop weld window 34, title strip or write-on title strip 36, thumb cut 38, flap aperture 40 arcuate flap ends 42 and a title strip pocket 44. Additionally, the associated compact disc edge 6 and compact disc aperture 8 are shown as positioned within the respective storage sleeves 2 for clarity. One skilled in the art will appreciate that the storage sleeves 2 of one embodiment of the invention may be secured in a notebook for operably securing a plurality of said storage sleeves.

The first sheet is commonly referred to as a back sheet and may be comprised of a transparent material such as plastic, vinyl or polypropylene. Alternatively, non-woven materials may be used. The third sheet, which is commonly referred to as the front sheet, may also be comprised of the same materials as used for the back sheet. The second sheet, commonly referred to as the middle sheet, is comprised of a single layer of non-woven material which is not laminated, bonded, glued or otherwise interconnected throughout its surface with any other sheet material or backing sheet. However, glues and other means known in the art may be utilized to interconnect the individual fibers of the non-woven material. Thus, in one embodiment the present invention the middle sheet is a single sheet of non-woven material having the trade name of Veratec®, and is referred to hereinafter as a single sheet non-woven material.

The single sheet non-woven material has numerous advantages over the prior art non-woven materials which are bonded or laminated to other backing materials. One major advantage is reduced manufacturing costs since one entire sheet of material is eliminated during manufacturing. This eliminated sheet is typically a backing sheet of polypropylene, vinyl or other plastic type of material. Alternatively the backing sheet may be a woven or another non-woven material which is provided for strength.

Non-woven materials previously used in sleeve designs did not have sufficient strength to prevent tearing or ripping during periods of extended use. This is essentially due to the manufacturing process utilized for these types of non-woven materials, where the fibers of the non-woven materials (typically a polypropylene fibrous material) are laid down with spinnerets onto a moving belt. The non-woven fibers are all generally oriented in the same linear orientation on the belt to form a web, at which time the fibers proceed through a roller wherein the mass is compressed into a sheet and the fibers tack bonded or welded together via small weldments through the fibrous mass. The resultant non-woven fabric has sufficient strength in one linear direction across the fibers, but is quite weak in other directions, which allows tearing during use of the sleeve.

To alleviate the tearing problem associated with the manufacturing process of typical non-woven materials, it is necessary to laminate the sheet of non-woven materials to other materials or to other sheets of non-woven materials to provide strength and durability. Unfortunately, this additional manufacturing step requires a laminating or bonding process, and additional materials which is expensive and thus increases the unit price per sleeve. Further, even when non-woven materials are bonded to other non-woven materials and not vinyl or other durable backing materials, the resultant non-woven laminated materials are not overly durable since these laminated, non-woven materials still have a tendency to tear.

The new single sheet non-woven material utilized in the present invention is manufactured in a distinct manner to produce a unique non-woven material which does not require any laminating, bonding or welding to create a durable material which is resistant to tearing yet still provides a protective surface for the CD playing surface. The single sheet non-woven material is manufactured with the spinnerets laying down a continuous polypropylene fiber (or other similar material) onto the moving belt as described above for the manufacturing of typical non-woven materials. However, the spinnerets move back and forth over the moving belt, thus permitting the fibers to be oriented diagonally to the direction of the belt, creating biaxially oriented fibers. The non-woven mat of material is then run through compression rollers where the non-woven material is tack bonded together. The resultant non-woven material has a much greater resistance to tear in the linear direction because of the random orientation of fibers, thus alleviating the need to bond the non-woven material to other backing sheet materials or other non-woven fibers. The savings in expense is substantial based on the elimination of an entire sheet of material and the laminating process associated therewith.

The foregoing description of the present invention has been presented for purpose of illustration and description. Furthermore, the description is not intended to limit the invention to the form disclosed herein. Consequently, variation and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other embodiments and with various modifications required by the particular application or use of the present invention. It is intended that the appended claims be construed to include alternative embodiments to he extent permitted by the prior art.

What is claimed is:

1. A sleeve adapted for holding a digital video disc on one side and a graphics page on an opposing side, comprising:
   a front sheet having a top edge, a bottom edge, a left lateral edge and a right lateral edge;
   a transparent back sheet having a top edge, a bottom edge, a left lateral edge and a right lateral edge;
   a non-woven middle sheet positioned between said front sheet and said transparent back sheet and having a top edge, a bottom edge, a left lateral edge and a right lateral edge, said non-woven middle sheet comprising a spun-bonded, continuous polypropylene fiber with a random fiber orientation;
   a first pocket formed by interconnecting said front sheet and said middle non-woven middle sheet along at least said left lateral edge, said right lateral edge and said bottom edge;
   a stop weld interconnecting said front sheet to said non-woven middle sheet to reduce an overall length of said first pocket and to elevate the digital video disc positioned in said first pocket above said bottom edge; and
   a second pocket formed by interconnecting said transparent back sheet and said non-woven middle sheet along at least said left lateral edge, said right lateral edge and said bottom edge, said second pocket adapted for holding the graphics page associated with the digital video disc and having a length greater than a diameter of said digital video disc.

2. The storage sleeve of claim 1, wherein said front sheet is comprised of a non-woven material.

3. The storage sleeve of claim 1, wherein said transparent back sheet has a non-linear upper edge to facilitate grasping said graphics page.

4. The storage sleeve of claim 1, wherein said front sheet further comprises a flap which at least partially covers the digital video disc.

5. The storage sleeve of claim 4, wherein said flap has a flap termination point shaped like a circular aperture which resists tearing.

6. The storage sleeve of claim 1, wherein said stop weld has a geometric shape which is substantially arcuate.

7. A storage sleeve adapted for holding at least one compact disc on one side and at least one graphics page on an opposing side, comprising:
   a flexible front sheet having a top edge, a bottom edge, a left lateral edge and a right lateral edge;
   a flexible back sheet having a top edge, a bottom edge, a left lateral edge and a right lateral edge;
   a flexible middle sheet sandwiched between said flexible front sheet and said flexible back sheet and having a top edge, a bottom edge, a left lateral edge and a right lateral edge, said flexible middle sheet comprising a non-woven, spun-bonded, continuous polypropylene fiber with a random fiber orientation;
   at least a first pocket for holding said at least one compact disc and at least a second pocket on an opposing side for holding said at least one graphics page which is formed by interconnecting at least said left lateral edge, said right lateral edge, and said bottom edge of said flexible front sheet, said flexible back sheet and said non-woven middle sheet.

8. The storage sleeve of claim 7, wherein said flexible front sheet and said flexible back sheet are comprised of a non-woven material.

9. The storage sleeve of claim 7, wherein said flexible front sheet and said flexible back sheet further comprise a non-linear edge which exposes at least a portion of the at least one compact disc and the at least one graphics page to facilitate grasping.

10. The storage sleeve of claim 7, further comprising a third pocket positioned along said top edge of said storage sleeve which is adapted for holding a title strip, said third pocket formed by interconnecting at least said front sheet and said non-woven middle sheet between said left lateral edge and said right lateral edge proximate to said top edge of said storage sleeve.

11. The storage sleeve of claim 7, further comprising a plurality of apertures positioned along said left lateral edge or said right lateral edge which are adapted for removably interconnecting said storage sleeve to a binding device.

12. A double-sided storage sleeve for holding at least one of a compact disc and a graphics page in a first pocket and a second pocket, said compact disc having an edge, an aperture and a planar surface, comprising:
   a flexible first sheet having a top edge, a bottom edge and two side edges;
   a flexible third sheet having a top edge, a bottom edge and two side edges;

a flexible, non-woven non-laminated second sheet having a top edge, a bottom edge and two side edges, said non-woven second sheet being positioned between said first sheet and said third sheet and comprising a spun bonded, continuous polypropylene fiber with a random fiber orientation; and said first sheet, said second sheet and said third sheet interconnected together at least on said bottom edge and said side edges to form a first pocket and a second pocket, wherein when said at least one said compact disc and said graphics page are positioned in at least one of said first and second pockets, respectively, said planar surface of each of said at least one compact discs are in contact with said non-woven, non-laminated second sheet.

13. The double-sided storage sleeve of claim 12, wherein said flexible first sheet and said flexible third sheet further comprise a non-linear top edge which exposes at least a portion of the first compact disc and the graphics page to facilitate grasping.

14. The double-sided storage sleeve of claim 12, further comprising a spine positioned along at least one of said two side edges for removably interconnecting said storage sleeve to a binding device.

* * * * *